Patented May 9, 1933

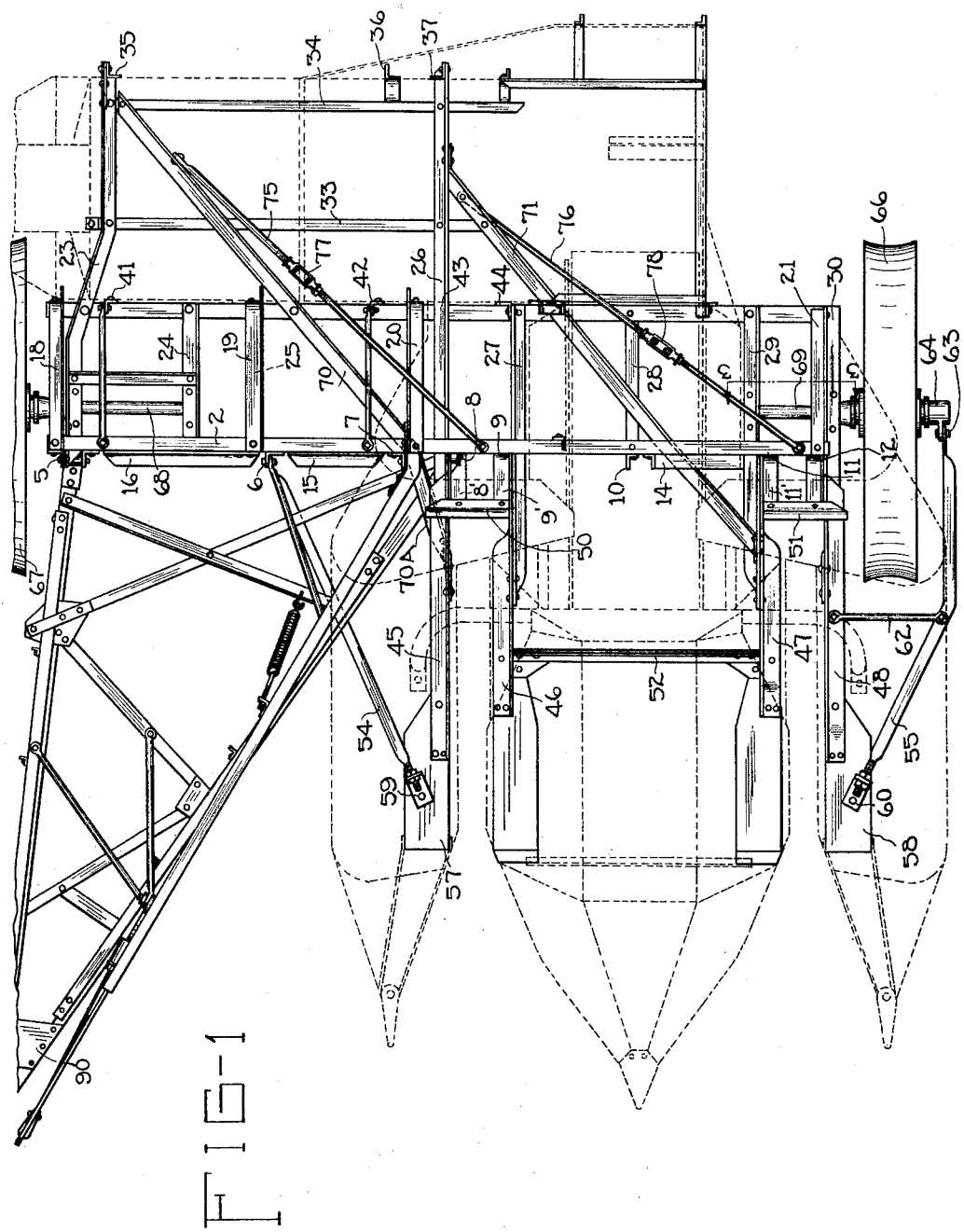

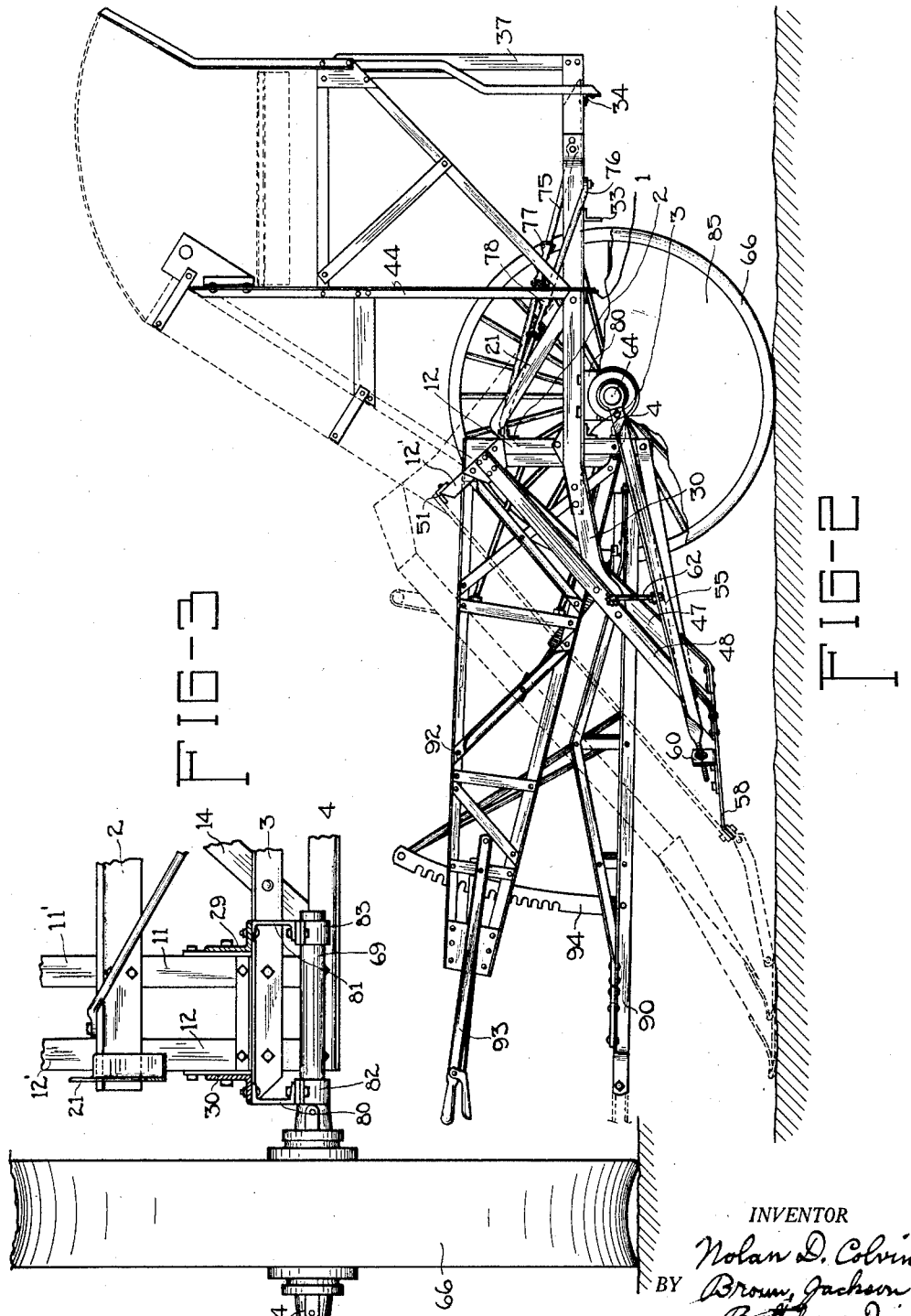

1,908,118

UNITED STATES PATENT OFFICE

NOLAN D. COLVIN, OF MOLINE, ILLINOIS, ASSIGNOR TO DEERE & COMPANY, OF MOLINE, ILLINOIS, A CORPORATION OF ILLINOIS

CORN HARVESTER

Application filed October 6, 1930. Serial No. 486,632.

The present invention relates generally to corn harvesters, and is primarily concerned with the frame structure which supports the various operating mechanisms making up the corn harvester. Usually such operating mechanisms include gathering and picking means for removing the ears of corn from the standing stalks and husking means for removing the husks from the ears of corn.

The principal object of the present invention is to provide an improved frame structure having such cooperating bracing and reinforcing means that the weight of the operating mechanism on one side of the supporting means for the frame structure balances the other operating mechanism on the other side of the supporting axis. In corn harvesters of the usual type the gathering and picking mechanisms are arranged at a point forward of the husking means, which latter is usually carried at the rear of the machine and also arranged laterally. With this in mind, the present invention contemplates more particularly an arrangement of parallel diagonally extending members for transmitting stresses from the portion of the frame structure supporting the husking mechanism to the portion of the frame structure which supports the gathering and picking mechanisms. Another object of the present invention is the provision of improved means for preventing corn stalks from becoming entangled in the spokes of the supporting wheel on the grain side of the harvester. In one instance the improved means embodies a shield or plate secured to the wheel for the purpose of presenting to any corn stalks in the path of the wheel a smooth surface which instead of allowing the corn stalks to become entangled in the spokes of the wheel effectively serves to deflect the corn stalks from said wheel. In another instance the improved means just referred to embodies a deflecting member angularly related to the line of travel of the harvester and so arranged as to push the corn stalks away from the grain wheel. Preferably this deflecting means is a modification of an adjustable brace by which the spacing between the gathering mechanisms may be varied. In its broader aspects this adjustable brace means is disclosed and claimed in the copending application of Wilbur J. Coultas, Serial No. 423,076, filed January 24, 1930, to which reference may be had.

Still further, another object of the present invention is an improved means for mounting the frame structure upon the supporting axle. More specifically, this feature of the present invention contemplates the provision of removable spacing blocks interposed between the frame structure and the supporting axle means so that the position of the frame structure, and hence of the harvester itself, may be adjusted with respect to the ground by inserting or removing the spacing blocks just referred to.

Other objects and advantages of the present invention will be apparent to those skilled in the art after a consideration of the following detailed description of the preferred structural embodiment, taken in conjunction with the accompanying drawings, in which:

Figure 1 is a top plan view of my improved frame structure, the operating mechanisms making up the corn harvester being indicated in dotted lines;

Figure 2 is a side view showing in elevation the structure illustrated in Figure 1; and Figure 3 is an enlarged detail view taken substantially along the line 3—3 of Figure 1.

Referring now to the drawings, the frame proper is seen to comprise a transversely extending triangular shaped frame structure from which extend forwardly, near one end, the frame members supporting the gathering and picking mechanisms, and from which frame structure extends rearwardly adjacent the opposite end the frame members supporting the husking mechanism at the rear of the machine. The triangular shaped transverse frame structure comprises four transversely extending angle members, best shown in Figure 2 and designated by the reference numerals 1, 2, 3 and 4. The angle members 2, 3 and 4 extend transversely and occupy parallel positions in a substantially vertical plane. The angle member 1, it will be noted, is parallel to the angle member 3 and lies substantially in the same horizontal plane. Angle members 2, 3, and 4 are connected together by means of a plurality of short vertical frame members, designated by reference numerals 5 to 12, inclusive, as best shown in Figure 1. These angle members are also connected by inclined angle braces 14, 15 and 16, also best shown in Figure 1.

The transverse frame member 1 is connected with the upper frame member 2 by a plurality of upwardly inclined angle members, designated in Figure 1 by reference numerals 18, 19, 20 and 21. Angle members 1 and 3 are connected by means of eight longitudinal members designated by reference numerals 23 to 30, inclusive. Two of these longitudinal members, 23 and 26, are extended rearwardly, as best shown in Figure 1, a substantial distance in rear of the angle member 1. These two extended longitudinal members support two transversely arranged frame members 33 and 34 which, together with the extended members 23 and 26, form the frame support for the husking mechanism carried at the rear of the corn harvester. Rising from this framework are three vertical members 35, 36 and 37 which serve to support the husking mechanism upon the framework just described. The husking mechanism also receives some support from the triangular frame construction through the upright members 41 to 44, inclusive, fixed at their lower ends to the transverse member 1.

The means for supporting the gathering and picking mechanisms will now be described. Longitudinal members 26, 27, 29, and 30 project forwardly of the plane of the transverse members 2, 3, and 4, the forward projections or extension of these longitudinal members being inclined downwardly slightly, as best shown in Figure 2. In addition, the upright members 8, 9, 11, and 12 have their upper ends inclined forwardly to provide extensions designated in Figure 1 by the reference numerals 8', 9', 11', and 12'. Downwardly inclined angle members 45, 46, 47, and 48 are supported on the ends of the forward extensions of the longitudinal members just described and on the forwardly and upwardly inclined extensions 8', 9', 11', and 12', the angular relation between these members being best shown in Figure 2. The upper ends of the extensions 8' and 9' are cross braced by means of brace 50, and extensions 11' and 12' are similarly braced by means of a brace 51. The gathering and picking mechanisms supporting members 46 and 47 are connected by a cross brace 52, best shown in Figure 1. The other gathering and picking mechanisms supporting members 45 and 48 are connected to the main frame by adjustable braces 54 and 55 which, at their rear ends are connected to the main frame and which, at their forward ends, are adjustably connected to supporting members 45 and 48. Preferably this adjustable connection is effected by means of plates 57 and 58 connected respectively to the supporting members 45 and 48 and clips 59 and 60 riveted or otherwise secured to the plates 57 and 58 and which are apertured to receive the threaded ends of the braces 54 and 55 by which the angular relation between the supporting members 45 and 48 and the main frame may be adjusted within flexural limits of these parts, more fully disclosed in the copending application referred to above.

As best shown in Figure 1, the brace 55, adjustably connected at its forward end to plate 58, is connected to the main frame by means of a strut 62 connecting the intermediate portion of the brace 55 to the supporting member 48 and a connection, as at 63 to the hub cap 64 of the supporting grain wheel 66. The brace 55, besides functioning as a brace for the gathering and picking mechanisms, also functions as a stalk deflector, holding the stalks which might otherwise fall beneath the wheel 66. Thus the brace 55 serves as a guide not only for the stalks, but also other objects, persons, or animals, to prevent their coming in contact with grain wheel 66.

Referring now more particularly to Figure 1, it will be noted that the supporting framework for the husking mechanism, which includes supporting members 23 and 26, and the transverse members 33 and 34, together with the associated uprights, is arranged in rear of the supporting axis defined by the supporting wheels 66 and 67 and the associated stub axles 68 and 69 secured to and supporting the main frame by means later to be described. It is also to be noted that the supporting framework for the picking and gathering mechanisms is forward of the supporting axis just defined. An important feature of the present invention relates to the manner in which the weight of the husking mechanism is balanced against the weight of the gathering and picking mechanisms. For the purpose of transmitting the balancing stresses from one framework to the other, two diagonally disposed parallel braces 70 and 71 have been provided. Brace 70 extends from the outer end of the husking mechanism frame, that is, the end adjacent the supporting wheel 67, diagonally across the transverse triangular framework or main frame and at its forward end is connected to the end of the forward extension of the longitudinal member 26. To accomplish this result the forward end of the diagonal member 70 is bent, as indicated by the reference numeral 70a in Figure 1. Brace member 71 is connected to the inner end of the husking mechanism framework and extends across the transverse triangular main frame and connects with the end of the forward extension of longitudinal member 29. Thus it may be said that through these two diagonal brace members one end of the husking mechanism is balanced by the inner picking mechanism, and the other end of the husking mechanism is balanced by the other picking mechanism. That is, the outer end of the husking mechanism, adjacent supporting wheel 67, is balanced by the right hand picking mechanism while the inner end of the husking mechanism balances the left hand picking mechanism by virtue of the transmission of stresses by braces or compression members 70 and 71, respectively.

The transmission of these balancing forces is further aided by the provision of the tension rods 75 and 76, connected at their rear ends to diagonal braces 70 and 71 and at their forward ends to the upper of transverse angle member 2. These tension rods 75 and 76 are each adjustable in length by means of turn buckles 77 and 78. Since the supporting members 45, 46, 47, and 48 carrying the gathering and picking mechanisms are connected at their rear and upper ends to the offset extensions 8', 9', 11' and 12', which in turn are connected to the transverse main frame member 2, these connections, including the tension rods 75 and 76 and the diagonal braces 70 and 71, form two similar substantially bridge-like trusses, the bending, compression, and tension stresses in which may be proportioned by adjusting the turn buckles 70, 71 and 78.

As indicated above, the main triangular frame structure is supported by and mounted on a transverse axis defined by the supporting wheels 66 and 67 and the stub axles 68 and 69. The axle 69 is affixed to the frame members 29 and 30 through two channel shaped spacing members or blocks 80 and 81 and two U-shaped brackets 82 and 83. These blocks or spacing members are fastened between frame members 29 and 30 and brackets 82 and 83 by means of bolts and nuts so that, if desired, the spacing members may be removed and the axle 69 bolted directly to the underside of frame members 29 and 30. Stub axle 68 is similarly supported on frame members 23 and 24 and a detailed description thereof is deemed unnecessary. By the provision of the spacing means 80 and 81 the height of the machine, and therefore the range of vertical adjustment of the gathering and picking mechanisms, may be adjusted and changed at will merely by the insertion or removal of these spacing members.

As best indicated in Figure 2, the outer side of supporting wheel 66 is covered with a shield or plate 85 bolted or otherwise secured thereto and preferably formed of sheet metal although any other suitable or desirable material may be employed if found desirable or feasible. The provision of the shield 85 effectively serves to prevent bent over corn stalks which would not be caught by the deflector 55 from winding up in the spokes or wheel 66. Only one shield is required for a corn harvester, and this is on the outer side of the wheel of the corn harvester running next to the rows of standing corn.

It is also to be noted that the corn harvester embodying the present invention includes the draft member 90 pivotally secured in any desired manner to the main frame and comprising a truss structure connected to the main frame at spaced apart points. Rigidly secured to the upright members 5 and 7 and to the transverse members 2 and 4 is the adjusting frame or truss 92 carrying at its forward end an adjusting lever 93 operatively associated with the sector 94 carried by the draft member 90. In Figure 2 the forwardmost part of the gathering and picking mechanisms is shown in dotted lines, and the relation of this part relative to the ground surface may be adjusted by operating the adjusting lever 93 in the usual manner.

While I have shown and described the preferred embodiment of the present invention, it is to be understood that my invention is not to be limited to the specific structure shown but that, in fact, widely different means may be employed in the practice of the broader aspects of my invention.

What I claim, therefore, and desire to secure by Letters Patent is:

1. In an agricultural machine, a transversely extending frame structure, means defining a wheel supported axis therefor and including spaced supporting wheels, forwardly extending frame members near one end of said frame structure and between the supporting wheels, picking mechanism supported thereby, rearwardly extending frame members adjacent the opposite end of said frame structure, husking mechanism supported by said rearwardly extending frame members, and connections between both of the forwardly extending frame members and the rearwardly extending frame members whereby one of said mechanisms balances the other.

2. In an agricultural machine, a transversely extending frame structure, means defining a wheel supported axis therefor, forwardly extending frame members near one end of said frame structure, picking mechanism supported thereby, rearwardly extending frame members adjacent the opposite end of said frame structure, husking mechanism supported by said rearwardly extending frame members, and diagonally extending braces connecting the rearwardly extending frame members to the forwardly extending members, said braces including compression members and tension members.

3. In an agricultural machine, a transversely extending frame including a plurality of transverse bars spaced apart vertically and horizontally and relatively inclined frame members connecting said bars and forming thereby a triangular-shaped frame, certain of said connecting members being extended rearwardly adjacent one end of said frame, other of said connecting members being extended forwardly adjacent the other end of said frame, diagonally disposed operating mechanisms supported on the forwardly and rearwardly extending members, and diagonally extending brace means connected with the upper of said transverse bars above the forwardly and rearwardly extending members and with said forwardly and rearwardly extending members for reinforcing the frame and balancing one of said mechanisms against the other.

4. In an agricultural machine, a transversely extending frame including a plurality of transverse bars spaced apart vertically, a transverse bar extending parallel with and spaced rearwardly of said plurality of bars, vertical members connecting the plurality of bars to one another, horizontal members connecting one of said plurality of bars with said parallel bar, and downwardly and rearwardly inclined members connected with said transverse bars and forming therewith a generally triangular-shaped frame, supporting means positioned rearwardly and vertically with respect to said inclined members, and operating mechanism supported by said last named means.

5. In an agricultural machine, a transversely extending frame including a plurality of transverse bars spaced apart vertically, a transverse bar extending parallel with and spaced horizontally of the intermediate bar of said plurality of bars, vertical members connecting the plurality of bars to one another, horizontal members connecting the intermediate bar and the transverse bar and forming therewith a generally triangular-shaped frame, certain of said horizontal members being extended rearwardly and certain being extended forwardly, inclined members connecting the upper of said plurality of bars with said transverse bar, downwardly and forwardly extending supporting members connected to the upper ends of the vertical members and to the forward ends of said forwardly extending members, diagonally extending braces connecting the rearwardly extending members with the forwardly extending members, and tension members connecting the rearwardly extending members with the upper of said plurality of bars.

6. In an agricultural machine, a transversely extending frame including a plurality of transverse bars spaced apart vertically, a transverse bar extending parallel with and spaced horizontally of the intermediate bar of said plurality of bars, vertical members connecting the plurality of bars to one another, certain of said vertical members having their upper ends turned forwardly, braces connecting adjacent turned ends thereof, horizontal members connecting the intermediate bar and the transverse bar, certain of said horizontal members being extended rearwardly and certain being extended forwardly, inclined members connecting the upper of said plurality of bars with said transverse bar and forming with said transverse bars a generally triangular-shaped frame, downwardly and forwardly extending supporting members connected to said turned ends of the vertical members and to the forward ends of said forwardly extending members, diagonally extending braces connecting the rearwardly extending members with the forwardly extending members, adjustable tension members connecting the rearwardly extending members with the upper of said plurality of bars, operating mechanism carried by the rearwardly extended horizontal members, and other operating mechanism carried by said downwardly and forwardly extending supporting members.

7. In an agricultural implement, a transverse frame mounted on a wheel supported transverse axis, said frame comprising a plurality of transverse vertically and horizontally spaced bars, fore and aft extending members connecting certain of said transverse bars, at least two of said connecting members extended rearwardly and provided with a transverse member, operating mechanism supported on said extended connecting members and said transverse member, and diagonal bracing means extending from said mechanism supporting means to the upper of said plurality of bars.

8. In an agricultural implement, a transverse frame mounted on a wheel supported transverse axis, said frame comprising a plurality of transverse bars, a plurality of transversely spaced fore and aft connecting bars, certain of said connecting bars extending rearwardly near one end of the transverse bars and others of the connecting bars near the other end of said transverse bars extending forwardly, and diagonally extending braces respectively connecting the rearwardly extending bars to the forwardly extending bars and to said transverse bars.

9. In an agricultural machine, a transversely extending frame structure, means defining a wheel supported axis therefor, forwardly extending frame members near one end of said frame structure, transversely spaced inner and outer picking mechanisms supported thereby, rearwardly extending frame members adjacent the opposite end of said frame structure, husking mechanism supported by said rearwardly extending frame members, and diagonally extending braces respectively connecting the rearwardly extending frame members with the forwardly extending members, whereby one end of the husking mechanism is balanced by the inner picking mechanism and the other end of the husking mechanism is balanced by the outer picking mechanism.

10. An agricultural implement comprising a wheel supported transverse frame structure, a plurality of forwardly extending supporting members secured to the frame, rearwardly extending supporting members also secured to the frame, bracing means connecting the forward members to the rearward members, and adjusting means for adjusting the position of the outermost forward members relative to the frame.

11. An agricultural implement comprising a wheel supported transverse frame structure, two pairs of forwardly extending supporting members secured to the frame, picking mechanism carried thereby, a separate pair of rearwardly extending supporting members also secured to the frame, husking mechanism carried thereby, bracing means respectively connecting the forward members with certain of the rearward members including adjusting means for adjusting the position of the forward members relative to the frame to adjust said picking mechanism.

12. An agricultural implement comprising, in combination, a transversely extending frame structure including a plurality of transverse spaced apart bars, fore and aft extending members connecting the bars, certain of said members extending forwardly and others of said members extending rearwardly, operating mechanisms carried on the forward and on the rearward members, angularly related brace means connecting the rearwardly extending members to the transverse bars, means including adjustable braces for securing the forwardly extending members in fixed position relative to said frame structure, whereby the operating mechanism on the rearward members counterbalances the operating mechanism on the forward members, a wheel and axle structure supporting said frame structure, removable spacing blocks interposed between the axle and the end of the frame secured thereto, and means associated with one of said braces for deflecting plants from one of the wheels.

13. In an agricultural machine, a supporting frame comprising a plurality of vertically spaced transverse bars and another transverse bar arranged in parallelism with and spaced from the plane of said first transverse bars, relatively short horizontal and vertical frame members connecting said transverse bars to form a transversely extending triangular-shaped frame, longitudinal frame bars extending rearwardly from the transverse bars adjacent one end of the triangular-shaped frame, other longitudinal bars connected at their rear ends with said transverse bars and extending forwardly therefrom adjacent the other ends of said transverse bars, and separate implement units supported respectively by said rearwardly extending and said forwardly extending frame bars.

14. In an agricultural machine, a wheel supported transverse frame comprising a plurality of interconnected transverse vertically and horizontally spaced bars, relatively short frame members adjacent the ends of said transverse bars, stub axles carried by said members, supporting wheels journaled on said axles, a longitudinal frame bar positioned substantially centrally of said transverse bars and extending forwardly and rearwardly therefrom, a second longitudinal frame bar having its forward end connected with said transverse bars adjacent one end thereof and extending rearwardly therefrom, a third longitudinally extending bar having its rear end connected with said transverse bars adjacent the other end thereof and extending forwardly therefrom, brace means connecting the rear end of said second longitudinal bar with the central longitudinal bar, and a second brace means connecting the rear end of said centrally disposed longitudinal bar and the forwardly extending longitudinal bar.

15. In an agricultural machine, a wheel supported transverse frame comprising a plurality of interconnected transverse vertically and horizontally spaced bars, relatively short frame members adjacent the ends of said transverse bars, stub axles carried by said members, supporting wheels journaled on said axles, a longitudinal frame bar positioned substantially centrally of said transverse bars and extending forwardly and rearwardly therefrom, a second longitudinal frame bar having its forward end connected with said transverse bars adjacent one end thereof and extending rearwardly therefrom, a third longitudinally extending bar having its rear end connected with said transverse bars adjacent the other end thereof and extending forwardly therefrom, brace means connecting the rear end of said second longitudinal bar with the central longitudinal bar, a second brace means connecting the rear end of said centrally disposed longitudinal bar and the forwardly extending longitudinal bar, and a draft frame connected with said transversely extending bars and disposed forward of second and rearwardly extending bar.

16. In an agricultural machine, a wheel supported transverse frame comprising a plurality of interconnected transverse vertically and horizontally spaced bars, relatively short frame members adjacent the ends of said transverse bars, stub axles carried by said members, supporting wheels journaled on said axles, a longitudinal frame bar positioned substantially centrally of said transverse bars and extending forwardly and rearwardly therefrom, a second longitudinal frame bar having its forward end connected with said transverse bars adjacent one end thereof and extending rearwardly therefrom, a third longitudinally extending bar having its rear end connected with said transverse bars adjacent the other end thereof and extending forwardly therefrom, brace means connecting the rear end of said second longitudinal bar with the central longitudinal bar, a second brace means connecting the rear end of said centrally disposed longitudinal bar and the forwardly extending longitudinal bar, and tension members connected with the upper of said transverse bars and the rear ends of said brace means.

In witness whereof, I hereunto subscribe my name this 2nd day of October 1930.

NOLAN D. COLVIN.